US008749637B2

(12) United States Patent
Muramatsu (10) Patent No.: US 8,749,637 B2
(45) Date of Patent: Jun. 10, 2014

(54) IMAGE RECOGNITION DEVICE, FOCUS ADJUSTMENT DEVICE, IMAGE-CAPTURING DEVICE, AND IMAGE RECOGNITION METHOD (75) Inventor: Keiko Muramatsu, Tachikawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/490,383

(22) Filed: Jun. 6, 2012

(65) Prior Publication Data
US 2012/0242888 A1 Sep. 27, 2012

Related U.S. Application Data (63) Continuation of application No. 12/289,594, filed on Oct. 30, 2008, now Pat. No. 8,218,064.

(60) Provisional application No. 61/001,103, filed on Oct. 31, 2007.

(30) Foreign Application Priority Data

Oct. 30, 2007 (JP) ................................. 2007-281455

(51) Int. Cl.
H04N 5/225 (2006.01)
(52) U.S. Cl.
USPC ........... 348/169; 348/349; 348/170; 348/171; 348/172
(58) Field of Classification Search
USPC ........................... 348/349, E5.045, 169–172; 382/217–220; 396/77–82, 102, 396/121–124
See application file for complete search history.

(56) References Cited

U.S. PATENT DOCUMENTS

2005/0031325 A1* 2/2005 Fujii ............................... 396/54
2006/0210260 A1* 9/2006 Yata ............................. 396/147
2008/0131109 A1  6/2008 Honjo et al.

FOREIGN PATENT DOCUMENTS

JP      A-06-83963      3/1994
JP      A-2006-58431    3/2006

OTHER PUBLICATIONS

Feb. 28, 2012 Notification of Reasons for Refusal issued in Japanese Application No. 2007-281455 w/translation.
Sep. 25, 2012 Office Action issued in Japanese Patent Application No. 2007-281455 (with English-language translation).

* cited by examiner

Primary Examiner — Roberto Velez
Assistant Examiner — Yih-Sien Kao
(74) Attorney, Agent, or Firm — Oliff PLC (57) ABSTRACT An image recognition device includes: an image sensor that captures an image via an image forming optical system and outputs image information repeatedly; a detector that detects differences between reference image information related to a reference image and a plurality of sets of partial information included in the image information; a recognition circuit that includes a microprocessor and recognizes a set of partial information, for which a smallest difference value among a plurality of differences detected in correspondence to the plurality of sets of partial information is calculated, as information matching the reference image information if the smallest value is smaller than a threshold value; and a controller that includes a microprocessor and sets the threshold value in correspondence to a color indicated in the reference image information.

8 Claims, 10 Drawing Sheets

IMAGE RECOGNITION DEVICE, FOCUS ADJUSTMENT DEVICE, IMAGE-CAPTURING DEVICE, AND IMAGE RECOGNITION METHOD

This is a continuation of U.S. patent application Ser. No. 12/289,594 filed Oct. 30, 2008, which claims the benefit of U.S. Provisional Application No. 61/001,103 filed Oct. 31, 2007. This application also claims priority from Japanese Application No. 2007-281455 filed Oct. 30, 2007. The disclosure of each of the earlier applications is incorporated herein by reference in its entirety.

BACKGROUND OF THE INVENTION

1. Field of the Invention

The present invention relates to an image recognition device, a focus adjustment device, an image-capturing device and an image recognition method.

2. Description of Related Art

There are autofocus systems known in the related art that track a target by storing an image of a focus adjustment target as a reference image (template image) and detecting through template matching an image area matching the reference image in each of images photographed successively (see, for instance, Japanese Laid Open Patent Publication No. 2006-058431).

SUMMARY OF THE INVENTION

However, an erroneous judgment may be made when determining similarity between a photographed image and the template image through template matching executed based upon the image color.

For instance, when the photographic subject is brightly colored, even a slight change in the conditions of light illuminating the subject may increase the color difference relative to the color of the template image to a level exceeding a threshold value used for similarity decision-making, resulting in an erroneous decision that a photographic subject actually matching that in the template image does not have similarity. When the photographic subject is substantially achromatic, the color difference relative to the template image is bound to be small to begin with and, for this reason, the color difference calculated in correspondence to a subject which is not actually the subject in the template image may turn out to be equal to or less than the similarity decision-making threshold value, resulting in an erroneous decision that the subject which does not actually match the subject in the template image has a high level of similarity.

According to the 1st aspect of the present invention, an image recognition device comprises: an image sensor that captures an image via an image forming optical system and outputs image information repeatedly; a detector that detects differences between reference image information related to a reference image and a plurality of sets of partial information included in the image information; a recognition circuit that includes a microprocessor and recognizes a set of partial information, for which a smallest difference value among a plurality of differences detected in correspondence to the plurality of sets of partial information is calculated, as information matching the reference image information if the smallest value is smaller than a threshold value; and a controller that includes a microprocessor and sets the threshold value in correspondence to a color indicated in the reference image information.

According to the 2nd aspect of the present invention, in the image recognition device according to the 1st aspect, it is preferred that when a size of an image corresponding to the reference image information is greater than a size of a target image contained in the image corresponding to the reference image information by an extent equal to or greater than a predetermined ratio, the controller sets the threshold value in correspondence to a color indicated in part of the reference image information.

According to the 3rd aspect of the present invention, in the image recognition device according to the 1st aspect, it is preferred that: the color indicated in the reference image information is represented by at least one value of an RGB value, a color difference value and a saturation level value pertaining to an image corresponding to the reference image information; and the controller sets the threshold value in correspondence to the at least one value pertaining to the image corresponding to the reference image information.

According to the 4th aspect of the present invention, in the image recognition device according to the 3rd aspect, it is preferred that the controller increases the threshold value to a greater extent when a largest value assumed for the value pertaining to the image corresponding to the reference image information exceeds a predetermined value and a difference between the largest value and the predetermined value is greater.

According to the 5th aspect of the present invention, in the image recognition device according to the 1st aspect, it is preferred that the image recognition device further comprises an updating circuit that updates the reference image information based upon the set of partial information in correspondence to which the smallest difference value is calculated, if the smallest difference value is smaller than the threshold value.

According to the 6th aspect of the present invention, a focus adjustment device comprises: an image recognition device according to the 1st aspect; a focus detector that detects a focusing condition of the image forming optical system in correspondence to a plurality of focus detection positions set within an image plane of the image forming optical system; and a focus adjustment unit that executes focus adjustment for the image forming optical system based upon the focusing condition detected by the focus detector at a focus detection position corresponding to the set of partial information recognized to match the reference image information by the recognition circuit.

According to the 7th aspect of the present invention, an image-capturing device comprises a focus adjustment device according to the 6th aspect.

According to the 8th aspect of the present invention, an image recognition method comprises: capturing an image via an image forming optical system and outputting image information repeatedly; detecting differences between reference image information related to a reference image and a plurality of sets of partial information included in the image information; recognizing a set of partial information, for which a smallest difference value among a plurality of differences detected in correspondence to the plurality of sets of partial information is calculated, as information matching the reference image information if the smallest difference value is smaller than a threshold value; and setting the threshold value in correspondence to a color indicated in the reference image information.

According to the 9th aspect of the present invention, in the image recognition method according to the 8th aspect, it is preferred that when a size of an image corresponding to the reference image information is greater than a size of a target image contained in the image corresponding to the reference image information by an extent equal to or greater than a predetermined ratio, the threshold value is set in correspondence to a color indicated in part of the reference image information.

According to the 10th aspect of the present invention, in the image recognition method according to the 8th aspect, it is preferred that: the color indicated in the reference image information is represented by at least one value of an RGB value, a color difference value and a saturation level value pertaining to an image corresponding to the reference image information; and the threshold value is set in correspondence to at least the one value pertaining to the image corresponding to the reference image information.

According to the 11th aspect of the present invention, in the image recognition method according to the 10th aspect, it is preferred that the threshold value is increased to a greater extent when a largest value assumed for the value pertaining to the image corresponding to the reference image information exceeds a predetermined value and a difference between the largest value and the predetermined value is greater.

According to the 12th aspect of the present invention, in the image recognition method according to the 8th aspect, it is preferred that the image recognition method further comprises updating the reference image information based upon the set of partial information in correspondence to which the smallest difference value is calculated if the smallest difference value is smaller than the threshold value.

DESCRIPTION OF PREFERRED EMBODIMENT

An embodiment of an image recognition device, a focus adjustment device and an image-capturing device (single-lens reflex digital still camera), which, equipped with an autofocus adjustment (AF) function whereby the focusing condition (a defocus amount in this embodiment) of a photographic lens is detected in a plurality of focus detection areas set within the photographic image plane and the photographic lens is driven to the focus match position based upon the defocus amount detected in correspondence to one of the areas and an image tracking function whereby an image of a tracking target subject within a photographic image is stored as a template image (reference image) and the tracking target subject is tracked by searching for the position of an image area within each of images captured successively, which is identical to or similar to the template image (through template matching), tracks the target as the photographic lens is driven by engaging both the AF function and the image tracking function, is now described.

Figure 1:
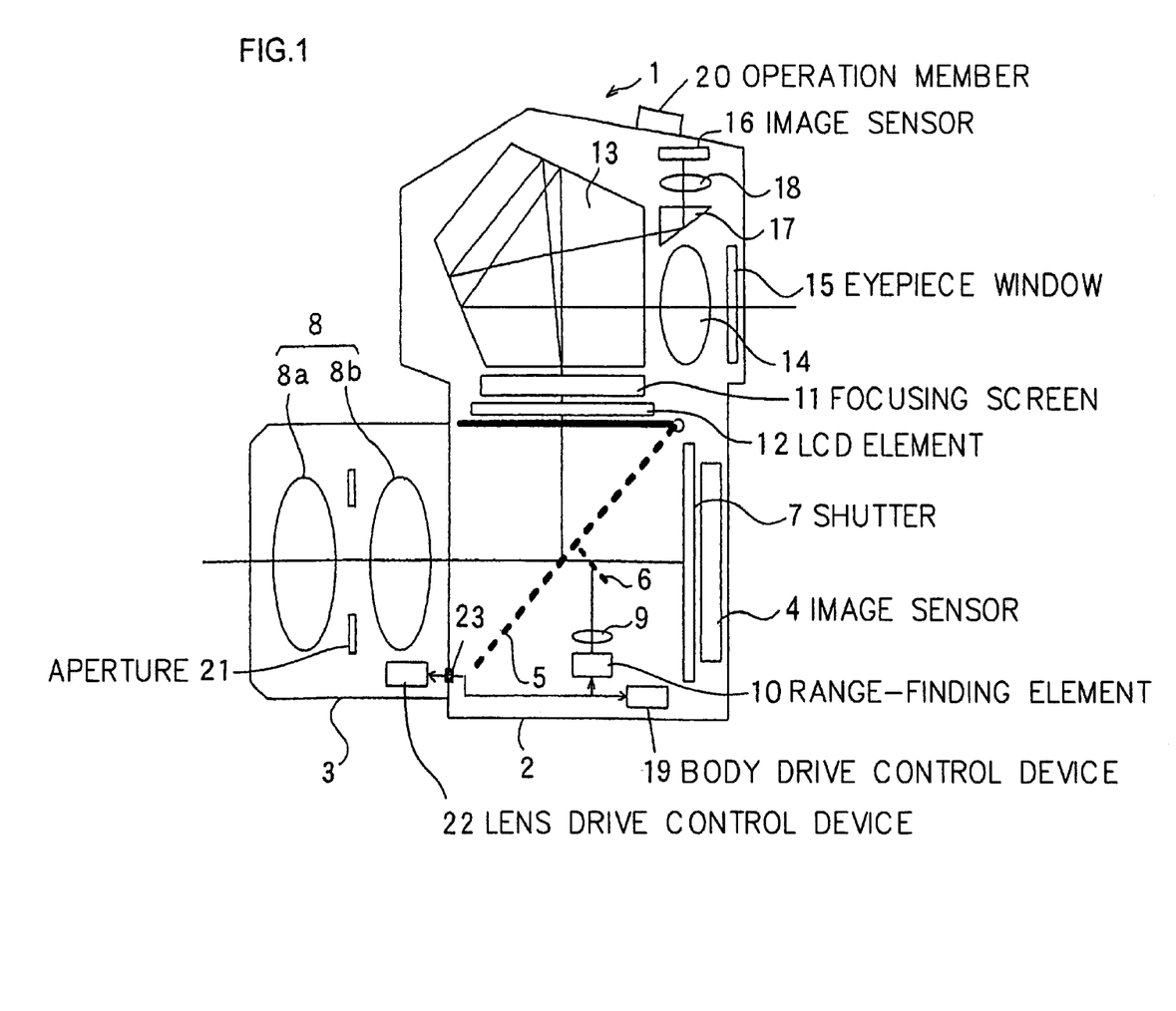
FIG. 1 shows the structure of an image-capturing device (single-lens reflex digital still camera) equipped with the image recognition device and the focus adjustment device achieved in an embodiment.

FIG. 1 shows the structure adopted in an image-capturing device (single-lens reflex digital still camera) that includes the image recognition device and the focus adjustment device achieved in the embodiment. It is to be noted that FIG. 1 does not include an illustration of camera components and circuits having no direct relevance to the present invention and that their explanation is not provided in reference to FIG. 1 either. An interchangeable lens 3 is detachably mounted at a camera body 2 of a camera 1 achieved in the embodiment. A first image sensor 4 engaged in operation in order to capture a subject image and record the captured image is installed at the camera body 2. The first image sensor 4 may be constituted with a CCD sensor or a CMOS sensor. When photographing an image, a quick-return mirror 5 and a sub-mirror 6 are set at retreat positions outside the photographic optical path indicated by the solid line and a shutter 7 is released so as to form a subject image at the light-receiving surface of the first image sensor 4 via a photographic lens 8.

At the bottom of the camera body 2, a focus detection optical system 9 and a range-finding element 10 engaged in operation to detect the focusing condition of the photographic lens 8, are disposed. In the embodiment, focus detection is executed by adopting a split-pupil phase detection method. The focus detection optical system 9 guides a pair of focus detection light fluxes having passed through the photographic lens 8 to the light-receiving surface of the range-finding element 10 and thus, a pair of optical images are formed at the light-receiving surface. The range-finding element 10 may include, for instance, a pair of CCD line sensors so as to output focus detection signals corresponding to the pair of optical images. The quick-return mirror 5 and the sub-mirror 6 assume positions within the photographic optical path as indicated by the dotted line prior to a photographing operation, so that the pair of focus detection light fluxes advancing from the photographic lens 8 are transmitted through the half mirror portion of the quick-return mirror 5, are reflected at the sub-mirror 6 and are then guided to the focus detection optical system 9 and the range-finding element 10.

A viewfinder optical system is disposed toward the top of the camera body 2. Prior to the photographing operation, the quick-return mirror 5 and sub-mirror 6 assume the positions indicated by the dotted lines and thus, subject light departing the photographic lens 8 is reflected at the quick-return mirror 5 and guided to a focusing screen 11, thereby forming a subject image on the focusing screen 11. A liquid crystal display element 12 displays information such as focus detection area marks superimposed over the subject image formed on the focusing screen 11 and also displays various types of photographic information including the exposure value at a position outside the subject image. The subject image formed on the focusing screen 11 is guided by a roof pentaprism 13 and an eyepiece lens 14 to an eyepiece window 15, through which the subject image can be observed by the photographer.

In addition, a second image sensor 16 that captures the subject image for purposes of subject tracking and photometering is disposed at the viewfinder optical system located toward the top of the camera body 2. The subject image having been formed at the focusing screen 11 is reformed at the light-receiving surface of the second image sensor 16 via a prism 17 and an image forming lens 18. The second image sensor 16 outputs image signals corresponding to the subject image. Tracking control and exposure calculation are executed based upon the subject image captured via the second image sensor 16 as detailed later.

In addition, a body drive control device 19, an operation member 20 and the like are disposed at the camera body 2. The body drive control device 19, constituted with a microcomputer (microprocessor), a memory and peripheral components such as an A/D converter, to be described in detail later, executes various types of control and arithmetic operations in the camera 1. The operation member 20 includes switches and selectors via which the camera 1 is operated, including a focus detection area selector switch and a photographing mode selector switch.

The interchangeable lens 3 includes a zooming lens 8a, a focusing lens 8b, an aperture 21 and a lens drive control device 22. It is to be noted that while the photographic lens 8 in the embodiment includes the zooming lens 8a, the focusing lens 8b and the aperture 21 as representative components thereof, the photographic lens 8 may adopt the structure other than that shown in FIG. 1. The lens drive control device 22, constituted with a microcomputer, a memory, a drive circuit and peripheral components such as an actuator (none shown), controls the drive of the lenses 8a and 8b and the aperture 21 and detects their positional settings. In the memory built into the lens drive control device 22, lens information indicating the focal length, the maximum aperture number and the like of the interchangeable lens 3 is stored.

The body drive control device 19 and the lens drive control device 22 are engaged in communication with each other via a contact point 23 at a lens mount unit, so as to transmit information indicating a lens drive quantity, an aperture value and the like from the body drive control device 19 to the lens drive control device 22 and transmit the lens information and aperture information from the lens drive control device 22 to the body drive control device 19.

Figure 2:
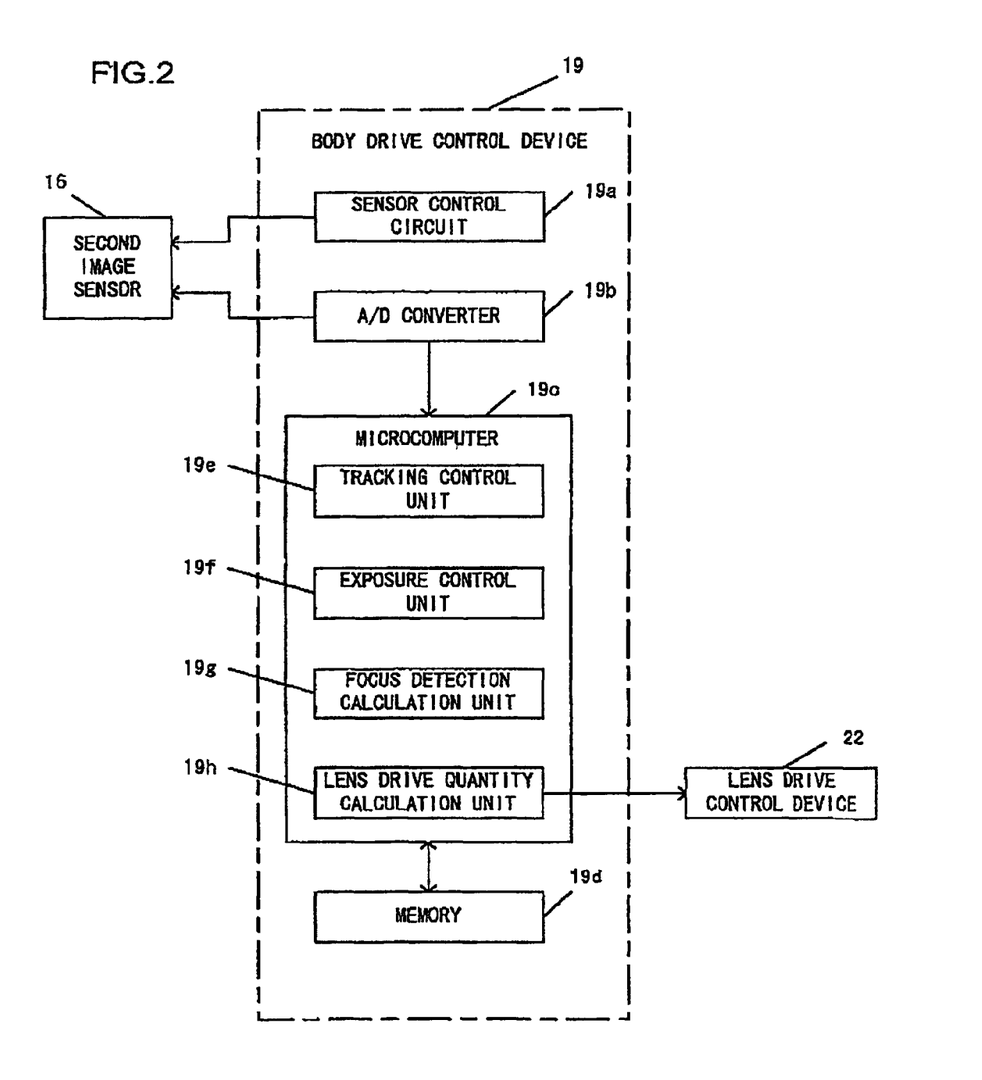
FIG. 2 illustrates in detail the structure of the body drive control device.

FIG. 2 shows in detail the structure adopted in the body drive control device 19. It is to be noted that control functions bearing no direct relevance to the present invention are not included in the illustration and their explanation is omitted. The body drive control device 19 includes a sensor control circuit 19a, an A/D converter 19b, a microcomputer 19c and a memory 19d. The sensor control circuit 19a controls charge storage and charge read at the second image sensor 16. The A/D converter 19b converts analog image signals output from the second image sensor 16 to digital image signals. The microcomputer 19c assumes a software configuration that includes a tracking control unit 19e, an exposure control unit 19f, a focus detection calculation unit 19g and a lens drive quantity calculation unit 19h. In the memory 19d, information such as a template image used in image tracking and a defocus amount, the lens information indicating the focal length, the maximum aperture F number, the aperture value, the conversion coefficient used to convert an image shift quantity to the defocus amount and the like pertaining to the photographic lens 8, or an initial value iDth for a similarity decision-making threshold value and a color threshold value MaxTh to be detailed later, and the like are stored.

The tracking control unit 19e stores into the memory 19d a template image (reference image) constituted with an image contained in the subject image captured via the second image sensor 16, which corresponds to a tracking target position manually specified by the photographer or a tracking target position automatically set in the camera 1. It recognizes the target position by detecting an image area in each of images subsequently photographed in succession, which is identical to or similar to the template image. The exposure calculation unit 19f calculates the exposure value based upon the image signals obtained through an image-capturing operation executed at the second image sensor 16.

The focus detection calculation unit 19g detects the focusing condition of the photographic lens 8, i.e., the defocus amount in this example, based upon focus detection signals corresponding to the pair of optical images output from the range-finding element 10. As explained in detail later, a plurality of focus detection areas are set within the photographic image plane of the photographic lens 8 and, accordingly, the range-finding element 10 outputs focus detection signals based upon the pair of optical images in correspondence to each focus detection area and the focus detection calculation unit 19g detects the defocus amount based upon the focus detection signals generated based upon the pair of optical images in correspondence to each focus detection area. The lens drive quantity calculation unit 19h converts the defocus amount thus detected to a lens drive quantity.

Figure 3:
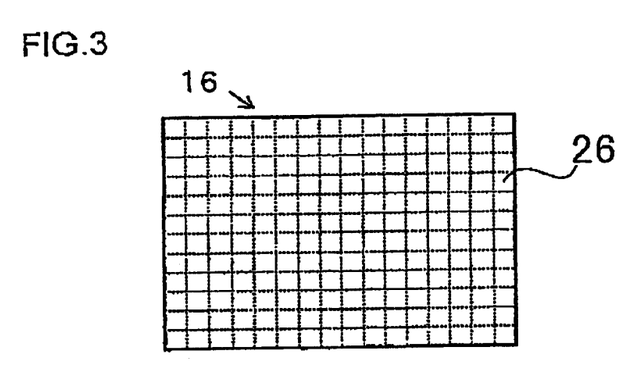
FIG. 3 is a front view showing in detail the structure of the second image sensor.
Figure 4:
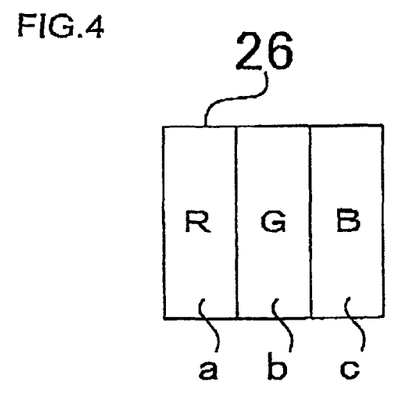
FIG. 4 is a front view illustrating in detail the structure of the pixels constituting the second image sensor.

FIG. 3 is a front view showing in detail the structure adopted in the second image sensor 16. The second image sensor 16 includes a plurality of pixels (photoelectric conversion elements) 26 arrayed in a matrix pattern (16 across×12 down=192 pixels in this example). As shown in FIG. 4, each pixel 26 is split into with portions 26a, 26b and 26c, and primary color filters, i.e., a red (R) color filter, a green (G) color filter and a blue (B) color filter, are disposed each at one of these portions 26a, 26b and 26c. Thus, R, G and B signals representing the subject image can be output from each pixel 26.

Figure 8:
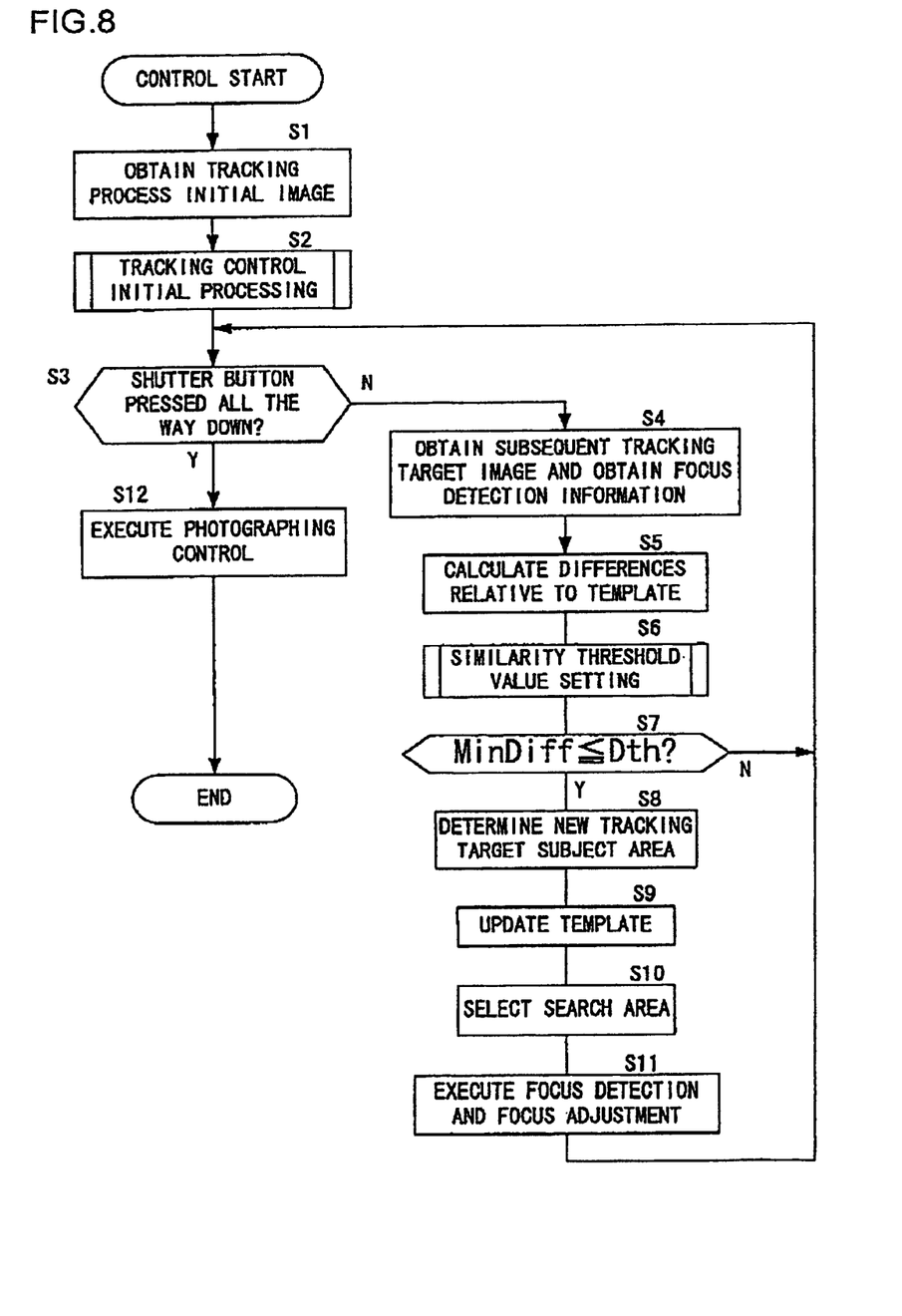
FIG. 8 presents a flowchart of the subject tracking processing executed in the embodiment.
Figure 9:
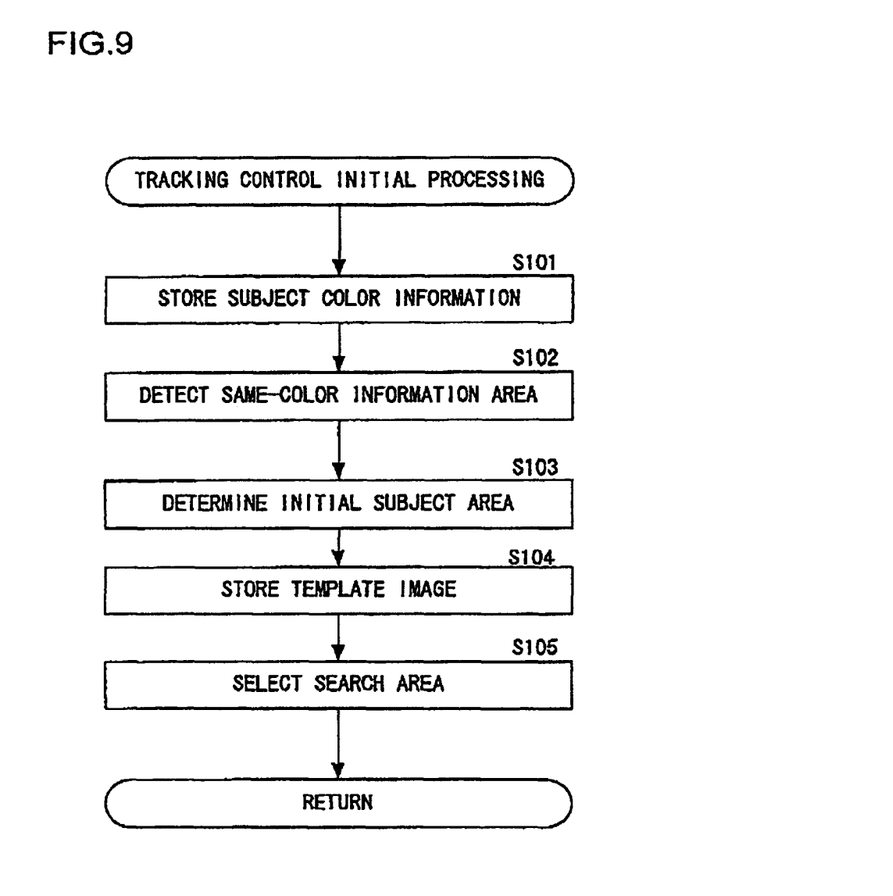
FIG. 9 presents a flowchart of the tracking control initial processing executed in the embodiment.
Figure 10:
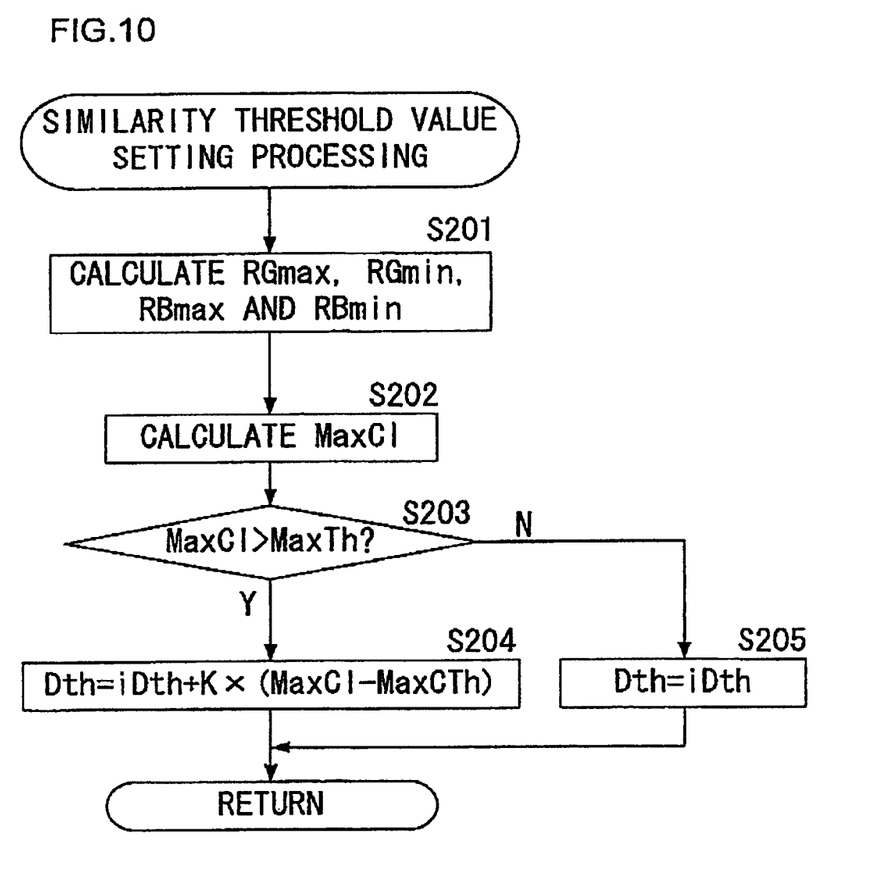
FIG. 10 presents a flowchart of the similarity threshold value setting processing executed in the embodiment.

Next, the subject tracking operation executed in the embodiment is explained. FIGS. 5 through 7B illustrate the subject tracking method adopted in the embodiment. FIGS. 8 through 10 each present a flowchart of the subject tracking processing executed in the embodiment. Until the shutter button is pressed all the way down to photograph an image, the quick-return mirror 5 is set within the photographic optical path indicated by the dotted line in FIG. 1 and an image is thus formed on the focusing screen 11 with the subject light advancing from the photographic lens 8. The subject image formed on the focusing screen 11 is then guided to the second image sensor 16 via the roof pentaprism 13, the prism 17 and the image forming lens 18, and subject image signals are repeatedly output from the second image sensor 16.

Figure 5:
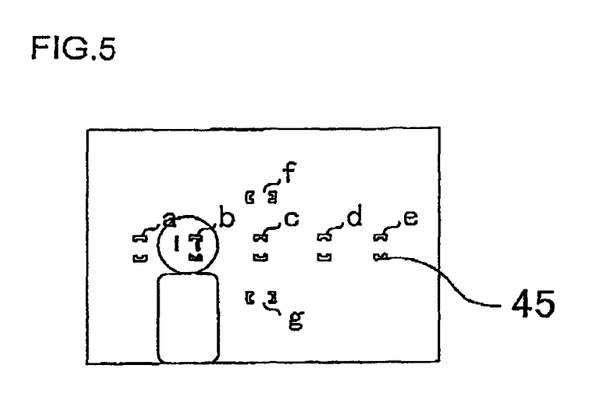
FIG. 5 illustrates the subject tracking method achieved in the embodiment.

A plurality of focus detection areas are set on the photographic image plane of the photographic lens 8, and the liquid crystal display element 12 superimposes area marks over the subject image formed on the focusing screen 11 so as to indicate the positions of the individual focus detection areas. As shown in FIG. 5, seven focus detection areas 45a~45g (notated as a~g in the figure) are set within the photographic image plane in the embodiment. In addition, as a given area is selected via the focus detection area selector switch in the operation member 20, the corresponding area mark becomes lit.

As the focus detection area 45b is selected via the focus detection area selector switch in the operation member 20, as shown in FIG. 5, and the shutter button in the operation member 20 is pressed halfway down in this state, the focus detection area 45b is stored as an initial AF area into the memory 19d. The tracking target subject is thus specified. It is to be noted that while the photographer manually specifies the tracking target subject by selecting the initial AF area in this example, the initial AF area and the tracking target subject may instead be set based upon subject recognition results if the camera is equipped with, for instance, an automatic subject recognition function.

In step 1, the second image sensor 16 takes in a tracking process initial image (the first image obtained after starting the image tracking processing). The tracking process initial image can be expressed by using R, G and B values in correspondence to each pixel.

$$R[x,y], G[x,y], B[x,y] \quad (1)$$

Based upon the R, G and B values, color information and luminance information are obtained through calculation in correspondence to each pixel. In the embodiment, RG and BG values indicating the extent of color predominance or color tendency are used as the color information and L calculated based upon the exposure time T, the gain Gain and color synthesis coefficients Kr, Kg and Kb set at the image acquisition is used as the luminance information.

$$RG[x,y] = \text{Log}_2(R[x,y]) - \text{Log}_2(G[x,y]),$$

$$BG[x,y] = \text{Log}_2(B[x,y]) - \text{Log}_2(G[x,y]),$$

$$L[x,y] = \text{Log}_2(Kr \times R[x,y] + Kg \times G[x,y] + Kb \times B[x,y]) - \text{Log}_2(T) - \text{Log}_2(\text{Gain}) \quad (2)$$

As expression (2) clearly indicates the color predominance indicator RG assumes a greater value to indicate that the template image takes on a predominantly red hue, whereas the color predominance indicator BG assumes a greater value to indicate that the template image takes on a predominantly blue hue. While an explanation is given in reference to the embodiment on an example in which the RG and the BG respectively indicating the extents of predominance of red color and blue color relative to green color are used as the color information, colors other than those may be used as the reference color and the colors compared with the reference color. It is to be noted that if hues other than RG and BG are to be used as the color information, the filters disposed at the pixels 26 in the second image sensor 16 shown in FIG. 4 must assume colors other than those in FIG. 4 so as to match the colors used as the color information.

Figure 6A:
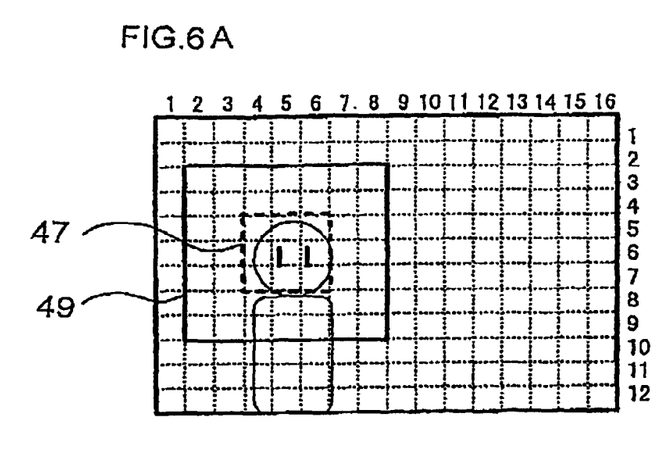
FIGS. 6A and 6B illustrate the subject tracking method achieved in the embodiment.

In the following step 2, the tracking control initial processing shown in FIG. 9 is executed. In step 101 in FIG. 9, the image contained in the tracking process initial image having been obtained via the second image sensor 16, present at the position corresponding to that of the focus detection area 45b, is stored as subject color information (color information and luminance information). In step 102, a same-color information area in the tracking process initial image, located near the position corresponding to the focus detection area 45b (see FIG. 5) and containing color information similar to the subject color information, is detected and this same-color information area is designated as an initial tracking target subject area 47 in the following step 103, as shown in FIG. 6A.

It is to be noted that while the tracking target subject area 47 is determined based upon the subject color information in this example, the processing may be simplified by assuming a uniform (e.g., 3×3 pixels) size for the tracking target subject area or the size of the subject area may be determined in correspondence to the distance information pertaining to the photographic lens 8.

Figure 6B:
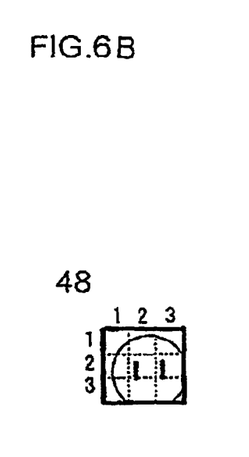

In step 104, the image contained in the tracking target subject area 47 in the tracking process initial image is stored into the memory 19d as a template image 48 (see FIG. 6B) to be used in the image tracking processing. For instance, assuming that the origin point of the tracking target subject area 47 is indicated with coordinate values (x,y)=(4,5) as shown in FIG. 6A, the color information RGref and BGref and the luminance information Lref of the template image 48 can be expressed as follows. It is to be noted that the horizontal axis and the vertical axis in FIG. 6A are respectively an x axis and a y axis, whereas the horizontal axis and the vertical axis in FIG. 6B are respectively an rx axis and an ry axis.

$$RGref[rx,ry] = RG[x,y],$$

$$BGref[rx,ry] = BG[x,y],$$

$$Lref[rx,ry] = L[x,y] \quad (rx,ry=1\sim3, x=4\sim6, y=5\sim7) \quad (3)$$

Next, an area centered on the tracking target subject area 47 and greater than the tracking target subject area by a predetermined number of pixels (two pixels in this example) on the upward side, the downward side, on the left side and on the right side is set as a search area 49 in step 105. In the example presented in FIG. 6A, the search area 49 is set over a coordinate range expressed as x=2~8 and y=3~9.

Once the tracking control initial processing ends, the operation proceeds to step 3 in FIG. 8 to make a decision as to whether or not the shutter button in the operation member 20 has been pressed all the way down, i.e., whether or not a shutter release operation has been performed. If it is decided that a shutter release operation has not been performed, the operation proceeds to step 4 to obtain a subsequent tracking target image from the second image sensor 16, calculates the color information RG(x,y) and BG(x,y) and the luminance information L(x,y) as in step 1 and store the color information and the luminance information into the memory 19d. Concurrently, focus detection signals generated based upon the pair of optical images for purposes of focus detection are obtained via the range-finding element 10 in correspondence to each of the focus detection areas 45a~45g.

In step 5, areas assuming the same size as that of the template image 48 are sequentially sliced out from the search area 49 set in the subsequent tracking target image and a difference Diff representing the difference of the color information in each sliced out image and the color information at the corresponding pixel in the template image 48 is calculated. As indicated by the bold dotted line in FIG. 7A, the color information difference Diff relative to the template image 48 is calculated by shifting the sliced-out area within the search area 49 by one pixel at a time.

Figure 7A:
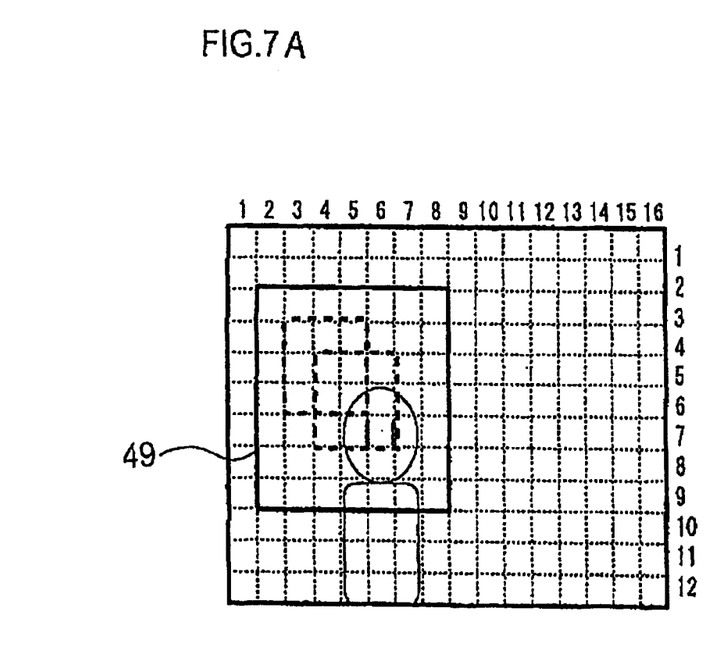
FIGS. 7A and 7B illustrate the subject tracking method achieved in the embodiment.

Assuming that the origin point of the search area 49 is at (scx,scy)=(2,3), as shown in FIG. 7A, the difference Diff may be calculated as expressed below.

$$\text{Diff}[dx,dy] = \Sigma\Sigma\{ABS(RG[scx+dx-1+rx, scy+dy-1+ry] - RGref[rx,ry]) + ABS(BG[scx+dx-1+rx, scy+dy-1+ry] - BGref[rx,ry]) + ABS(L[scx+dx-1+rx, scy+dy-1+ry] - Lref[rx,ry])\} \quad (4)$$

In expression (4), dx, dy=1~5, rx, ry=1~3, scx=2, scy=3 and Σ represents the summation operation for rx=1~3 and ry=1~3.

Next, the difference indicating the smallest value among all the differences Diff having been calculated as expressed in (4) is designated as a minimum difference MinDiff. In the example presented in FIG. 7A, the minimum difference MinDiff is assumed at the position (minx, miny) indicated by coordinates (5, 6), which can be translated to coordinate values (4, 4) in the coordinate system assumed within the search area 49. The minimum difference MinDiff assumes a smaller value to indicate a higher level of similarity to the template image 48.

In step 6, the similarity threshold value setting subroutine in FIG. 10 is executed to set a similarity decision-making threshold value Dth. In the embodiment, the threshold value Dth to be used to determine the level of similarity through template matching is set based upon the color information corresponding to the template image 40. In step 201 in FIG. 10, largest values RGmax and BGmax and smallest values RGmin and BGmin among the values indicated in the color information (color differences or chrominances) RGref and BGref pertaining to the template image 48, having been stored into the memory 19d in step 104, are searched.

$$RGmax=MAX(RGref[rx,ry]),$$

$$RGmin=MIN(RGref[rx,ry])$$

$$BGmax=MAX(BGref[rx,ry]),$$

$$BGmin=MIN(BGref[rx,ry]) \quad (5)$$

In expression (5), rx and ry each assume values within a range of 1~3.

In the following step 202, the value with the largest absolute value among the largest values RGmax and BGmax and the smallest values RGmin and BGmin in the color information is designated as a maximum color value MaxCl.

$$MaxCl=MAX\{ABS(RGmax),ABS(RGmin),ABS(BGmax),ABS(BGmin)\} \quad (6)$$

In step 203, the maximum color value MaxCl is compared with a predetermined color threshold value MaxTh and the operation proceeds to step 204 if the maximum color value MaxCl is greater than the color threshold value MaxTh to increase the similarity decision-making threshold value Dth. In the embodiment, the similarity decision-making threshold value Dth is adjusted as expressed below.

$$Dth=iDth+K \cdot (MaxCl-MaxTh) \quad (7)$$

iDth in expression (7) represents the initial value assumed for the similarity decision-making threshold value. A "similarity decision-making threshold value", at which a red color subject, for instance, can be tracked with a high level of accuracy (with a high accuracy rate), determined through test tracking executed by altering the conditions set forth with regard to the threshold value, should be selected as the initial value iDth. In other words, the initial value iDth should be determined based upon a difference value at which an accurate tracking position can be output by executing test tracking calculation for a highly saturated subject such as a red color subject. In addition, K represents a gain constant by which the difference between the maximum color value MaxCl and the color threshold value MaxTh is multiplied. This gain constant should be determined by conducting any of various types of testing or simulation.

If it is decided that the maximum color value MaxCl is equal to or less than the color threshold value MaxTh, the operation proceeds to step 205 to decide that the template image 48 does not contain any highly saturated subject and, accordingly, the initial value iDth is sustained as the similarity decision-making threshold value Dth. Once the similarity decision-making threshold value Dth is set, the operation returns to step 7 in FIG. 8. It is to be noted that the initial value iDth for the similarity decision-making threshold value and the color threshold value MaxTh should be selected based upon a typical image, which would be routinely used as a template image in a standard photographic scene and that these values should be stored in the memory 19d in advance.

In step 7 in FIG. 8, the minimum difference MinDiff having been determined in step 5 is compared with the similarity decision-making threshold value Dth. If the minimum difference MinDiff is greater than the similarity decision-making threshold value Dth, the image present in the area in correspondence to which the minimum difference value MinDiff has been calculated is judged to be not similar to the template image 48, and the operation returns to step 3 to repeatedly execute the processing described above. If, on the other hand, the minimum difference value MinDiff is equal to or less than the similarity decision-making threshold value Dth, the image present in the area in correspondence to which the minimum difference value MinDiff has been calculated is judged to be similar to the template image 48 and the operation proceeds to step 8.

In step 8, the area in correspondence to which the minimum difference value MinDiff has been calculated is designated as a new tracking target subject area 47. In the example presented in FIG. 7B, the new tracking target subject area 47 ranges over an area indicated by the dotted line frame, the origin point of which is (x,y)=(5,6). In the following step 9, the template image is updated by using the image information contained in the new tracking target subject area 47. In the embodiment, color information RGref and BGref and luminance information Lref for the new template image 48 are generated by, for instance, adding the image information in the new tracking target subject area 47 at a rate of 20% to the 80% accounted for by the image information in the current template image 48, as expressed below and the newly generated color information and luminance information are stored into the memory 19b.

$$RGref[rx,ry]=0.8 \cdot RGref[rx,ry]+0.2 \cdot RG[x,y],$$

$$BGref[rx,ry]=0.8 \cdot BGref[rx,ry]+0.2 \cdot BG[x,y],$$

$$Lref[rx,ry]=0.8 \cdot Lref[rx,ry]+0.2 \cdot L[x,y],$$

$$(rx,ry=1\sim3, x=5\sim7, y=6\sim8) \quad (8)$$

It is to be noted that the ratio of the image information in the current template image and the image information in the new tracking target subject area 47, incorporated in order to update the template image 48, may be a fixed value as described above or it may be a variable adjusted in correspondence to the minimum difference MinDiff.

Figure 7B:
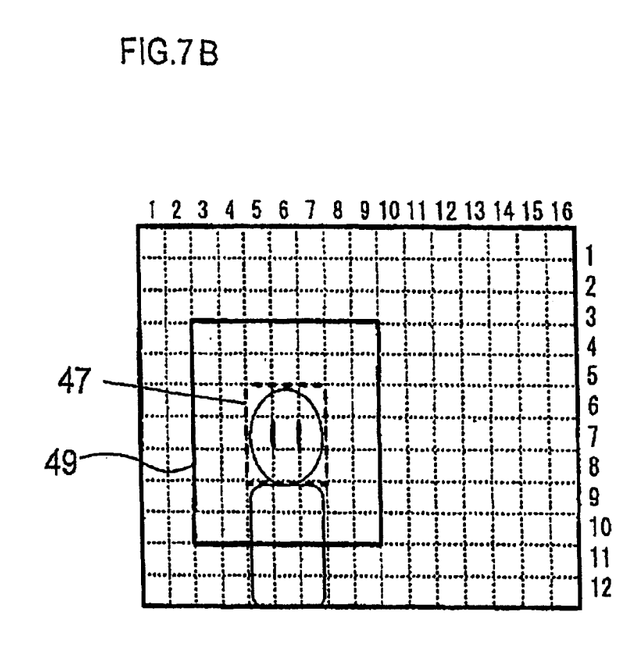

In step 10, an area centered on the new tracking target subject area 47 and greater than the tracking target subject area by a predetermined number of pixels (two pixels in this example) on the upward side, the downward side, on the left side and on the right side is set as a new search area 49, the new search area 49 is set over a coordinate range expressed as x=3~9 and y=4~10, as shown in FIG. 7B.

In the following step 11, focus detection calculation of the known art is executed based upon the focus detection signals obtained in step 4 in correspondence to the focus detection area present within the new tracking target subject area 47 or a focus detection area present near the new tracking target subject area 47, among the focus detection areas 45a~45g shown in FIG. 5, and the defocus amount indicating the extent of defocus manifesting in the particular focus detection area is calculated. The defocus amount detected in correspondence to the focus detection area within or near the new tracking target subject area 47 is converted to a lens drive quantity and focus adjustment is executed by driving the focusing lens 8b via the lens drive control device 22. Subsequently, the operation returns to step 3 to repeatedly execute the processing described earlier.

Following the focus adjustment, a decision is made in step 3 as to whether or not the shutter button has been pressed all the way down. While the shutter button is held halfway down, the processing in steps 4~11 is executed repeatedly and, once the shutter button is pressed all the way down, the operation proceeds to step 12 to execute photographing processing. It is to be noted that during image-capturing processing, exposure calculation is executed based upon the luminance information in the new tracking target subject area 47 having been determined in step 8 so as to calculate the optimal aperture value and shutter speed. Based upon these exposure values, the drive of the shutter 7 and the aperture 21 is controlled as the first image sensor 4 captures an image.

As described above, the structure adopted in the embodiment includes the second image sensor 16, which repeatedly outputs image information by capturing images via the photographic lens 8, the memory 19*d*, in which the reference image information pertaining to the template image used for reference is stored, and the body drive control device 19, which detects differences Diff each representing the difference between one of the plurality of sets of partial information contained in the image information and the reference image information, recognizes the partial information in correspondence to which the minimum difference value MinDiff is calculated as information matching the reference image information if the minimum difference value MinDiff among the plurality of differences Diff detected in correspondence to the plurality of sets of partial information is smaller than the threshold value Dth and adjusts the threshold value Dth in correspondence to the color indicated in the reference image information. As a result, even when the template image takes on a highly saturated color or a hue that is almost achromatic, an accurate decision can be made with regard to the similarity between the image information and the reference image information in the template image during the template matching processing. The subject tracking performance can be improved effectively by adopting the present invention in an image tracking device such as that described above.

It is to be noted that if the volume of the reference image information is large relative to the volume of the image information, the threshold value Dth should be adjusted in correspondence to the color indicated in apart (corresponding to a central area or the like) of the reference color information. Through such measures, a threshold value more accurately reflecting the color of the target subject can be set and ultimately, a further improvement in the subject tracking performance can be achieved.

For instance, an image of a main subject present within the template image is detected. If the size of the template image is greater than the size of the detected main subject image by an extent equal to or greater than, instance, an areal ratio of 20%, the threshold value Dth should be adjusted in correspondence to the color of the central area of the template image or in correspondence to the color of the detected main subject image. The areal ratio, based upon which the decision is made as described above, may be a value other than 20%. The areal ratio should assume an optimal value determined through any of various types of testing, simulation or the like. In short, if the size of the template image is greater than the size of the main subject image within the template image by an extent equal to or greater than the predetermined ratio, the threshold value Dth should be adjusted in correspondence to the color assumed in part of the template image (reference image information).

The main subject image within the template image may be detected through a method in the related art such as face detection method. In addition, the photographing distance information and the focal length information may be obtained and the size of the main subject may be estimated based upon the photographing distance information and the focal length information having been obtained. In other words, the size of the subject can be estimated in correspondence to the photographing magnification factor determined based upon the photographing distance information and the focal length information. In such a case, an object taking up a certain area and present around the center of the template image should be determined to be the main subject and the color information present within the areal range taken up by the main subject should be utilized.

In addition, if the minimum difference value MinDiff is smaller than the threshold value Dth, the reference image information in the template image is updated based on the partial information in correspondence to which the minimum difference value MinDiff has been calculated in the embodiment. Thus, even if the reference image shifts or a change occurs in the color or the brightness, accurate reference image information of the reference image can be obtained so as to revise the reference image information with the most up to date information. As a result, a significant improvement in the subject tracking performance can be achieved, particularly in an image tracking device such as that described earlier.

In the embodiment, focus adjustment for the photographic lens 8 is executed based upon the focusing state detected in the focus detection area corresponding to the partial information constituting part of the image information and recognized to match the reference image information. As a result, the focus can be adjusted for the reference image and a focused reference image can be obtained.

It is to be noted that while an explanation is given above in the embodiment on an example in which the values RG and BG indicating the extents of color predominance or color tendency are used as the color information in the template image and the similarity decision-making threshold value Dth is adjusted in correspondence to the maximum value MaxCl among the RG and BG values, the similarity decision-making threshold value Dth may instead be adjusted based upon the largest value among the R, G and B values representing the template image. For instance, if the largest value MaxRGB among the R, G and B values is greater than a predetermined value MaxRGB_Th, the similarity decision-making threshold value Dth may be adjusted as expressed below $$Dth = iDth + K' \cdot (MaxRGB - MaxRGB\_Th) \qquad (9)$$

K' in expression (9) represents a gain constant by which the difference between the largest value MaxRGB among the R, G and B values and the predetermined value MaxRGB_Th is multiplied. In addition, the similarity decision-making threshold value Dth may be adjusted in correspondence to the largest value among color values corresponding to a single color or a plurality of colors other than the R, G and B values representing the template image.

Furthermore, color difference (or chrominance) values or saturation level values indicated in, for instance, YCbCr data may be used as the color information representing the template image and the similarity decision-making threshold value Dth may be increased in proportion to these values. As a further alternative, the similarity decision-making threshold value Dth may be adjusted based upon a single value or a plurality of values among the R, G and B values, the color difference values and the saturation level value of the template image.

The following processing, similar to that shown in FIG. 10, should be executed based upon the saturation level. "SAT" indicates the saturation level and "SATref" represents the saturation level information corresponding to the template image. The largest value indicated by the SAT data is determined and designated as a maximum color value MaxCl by executing calculation expressed below on each of the pixels constituting the template image data. The saturation level is determined by executing a predetermined arithmetic operation in a predetermined color space. For instance, the saturation level may be calculated as $\sqrt{(a^{*2}+b^{*2})}$ in the L*a*b* space.

$$MaxCl=MAX(SATref[rx,ry])\ (rx,ry=1\sim3) \quad (10)$$

Next, the maximum color value MaxCl having been calculated is compared with a predetermined color threshold value MaxTh and if the maximum color value MaxCl is greater than the color threshold value MaxTh, the similarity decision-making threshold value Dth is increased. The similarity decision-making threshold value Dth may be adjusted as expressed below. As in expression (7), iDth represents the initial value for the similarity decision-making threshold value and K" represents a saturation gain constant by which the difference between the maximum color value MaxCl and the color threshold value MaxTh is multiplied.

$$Dth=iDth+K''\times(MaxCl-MaxTh) \quad (11)$$

While an explanation is given above in reference to the embodiment on an example in which focus detection is executed via the focus detection optical system 9 and the range-finding element 10, provided as separate units independent of the first image sensor 4 engaged in image-capturing operation, the image-capturing operation and the focus detection may both be executed via a first image sensor 4, adopting a structure that includes focus detection pixels disposed in part of a two-dimensional array of imaging pixels, without installing the focus detection optical system 9 or the range-finding element 10.

The above described embodiment is an example and various modifications can be made without departing from the scope of the invention.

What is claimed is:

1. An image tracking device, comprising: an image sensor that captures a first image and a second image captured after the first image;
    a storage unit that stores a partial image corresponding to a tracking target within the first image as a reference image;
    a setting unit that sets a threshold value that is used to make a decision of similarity between a partial image of the second image and the reference image; and
    a decision making unit that makes a decision that the partial image and the reference image are similar to each other when a difference between the partial image and the reference image is smaller than the threshold value, and makes a decision that the partial image and the reference image are not similar to each other when the difference between the partial image and the reference image is not smaller than the threshold value, wherein
    the setting unit sets the threshold value larger when a color indicated in the reference image is a first color than when the color indicated in the reference image is a second color.

2. The image tracking device according to claim 1, wherein:
    the second color is achromatic and the first color is chromatic.

3. The image tracking device according to claim 1, wherein:
    information of the color indicated in the reference image is represented by at least one value of an RGB value, a color difference value and a saturation level value.

4. The image tracking device according to claim 1, wherein:
    the control unit generates the reference image by using the partial image of the second image when the decision making unit has made a decision that the partial image of the second image and the reference image are similar to each other.

5. The image tracking device according to claim 1, wherein:
    the first color is more saturated color than the second color.

6. An image tracking device, comprising:
    an image sensor that captures a first image and a second image captured after the first image;
    a setting unit that sets a threshold value that is used to make a decision of similarity between a partial image of the second image and a reference image that is a partial image corresponding to a tracking target within the first image;
    a decision making unit that makes a decision that the partial image and the reference image are similar to each other when a difference between the partial image and the reference image is smaller than the threshold value, and makes a decision that the partial image and the reference image are not similar to each other when the difference between the partial image and the reference image is not smaller than the threshold value and
    a control unit that updates the reference image with the partial image of the second image when the decision making unit has made a decision that the partial image of the second image and the reference image are similar to each other, wherein
    the setting unit sets the threshold value larger when a color indicated in the reference image is a first color than when the color indicated in the reference image is a second color.

7. The image tracking device according to claim 6, wherein:
    the second color is achromatic and the first color is chromatic.

8. The image tracking device according to claim 6, wherein:
    the control unit updates the reference image by using the partial image of the second image when the decision making unit has made a decision that the partial image of the second image and the reference image are similar to each other.

* * * * *